United States Patent
Barbison et al.

(10) Patent No.: US 6,926,128 B2
(45) Date of Patent: Aug. 9, 2005

(54) ADAPTIVE SHOCK DAMPING CONTROL

(75) Inventors: James M. Barbison, Brampton (CA); Kevin H. Erickson, Etobicoke (CA); Arnett R. Weber, Mississauga (CA); Ronald W. Farewell, Mississauga (CA); Richard Coury, Rochester Hills, MI (US); Thomas R. King, Milton (CA); Stephen H. Bell, Guelph (CA); Nelson C. Goncalves, Mississauga (CA)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 10/458,601

(22) Filed: Jun. 10, 2003

(65) Prior Publication Data

US 2004/0251097 A1 Dec. 16, 2004

(51) Int. Cl.$^7$ .................................................. F16F 9/00
(52) U.S. Cl. .................. 188/315; 188/318; 188/322.13
(58) Field of Search .................................. 188/314–316, 188/318, 107, 269, 281, 287, 322.13, 322.14, 322.19, 321.11; 267/119, 124, 217

(56) References Cited

U.S. PATENT DOCUMENTS

| | | | | |
|---|---|---|---|---|
| 3,991,863 A | * | 11/1976 | Lee | 188/289 |
| 4,240,531 A | * | 12/1980 | Postema | 188/315 |
| 5,487,480 A | * | 1/1996 | Page et al. | 213/43 |
| 5,738,191 A | * | 4/1998 | Forster | 188/318 |
| 6,357,612 B1 | * | 3/2002 | Monaco et al. | 213/43 |
| 6,581,733 B2 | * | 6/2003 | Kazmirski | 188/275 |

FOREIGN PATENT DOCUMENTS

EP          1355081 A1  *  10/2003

* cited by examiner

*Primary Examiner*—Pam Rodriguez
(74) *Attorney, Agent, or Firm*—Carlson, Gaskey & Olds

(57) ABSTRACT

A shock absorber damper assembly is provided that includes a working cylinder filled with fluid. A piston and rod are disposed in the working cylinder and move along an axis to provide dampening during a compression stroke. For a twin tube arrangement, a reservoir surrounds the working cylinder and may include a gas cell to accommodate the volume of the rod. A recoil valve controls flow of the fluid from the working cylinder to the reservoir during a recoil stroke. The recoil valve has an opening force controlling damping during the recoil stroke. A fluid passageway, which may be located in the reservoir, connects the working cylinder and the recoil valve. A check valve is disposed in the fluid passageway and opens to receive the fluid during the compression stroke. The check valve closes during the recoil stroke to retain the fluid against the recoil valve at a pressure and adjust the opening force of the recoil valve.

12 Claims, 2 Drawing Sheets

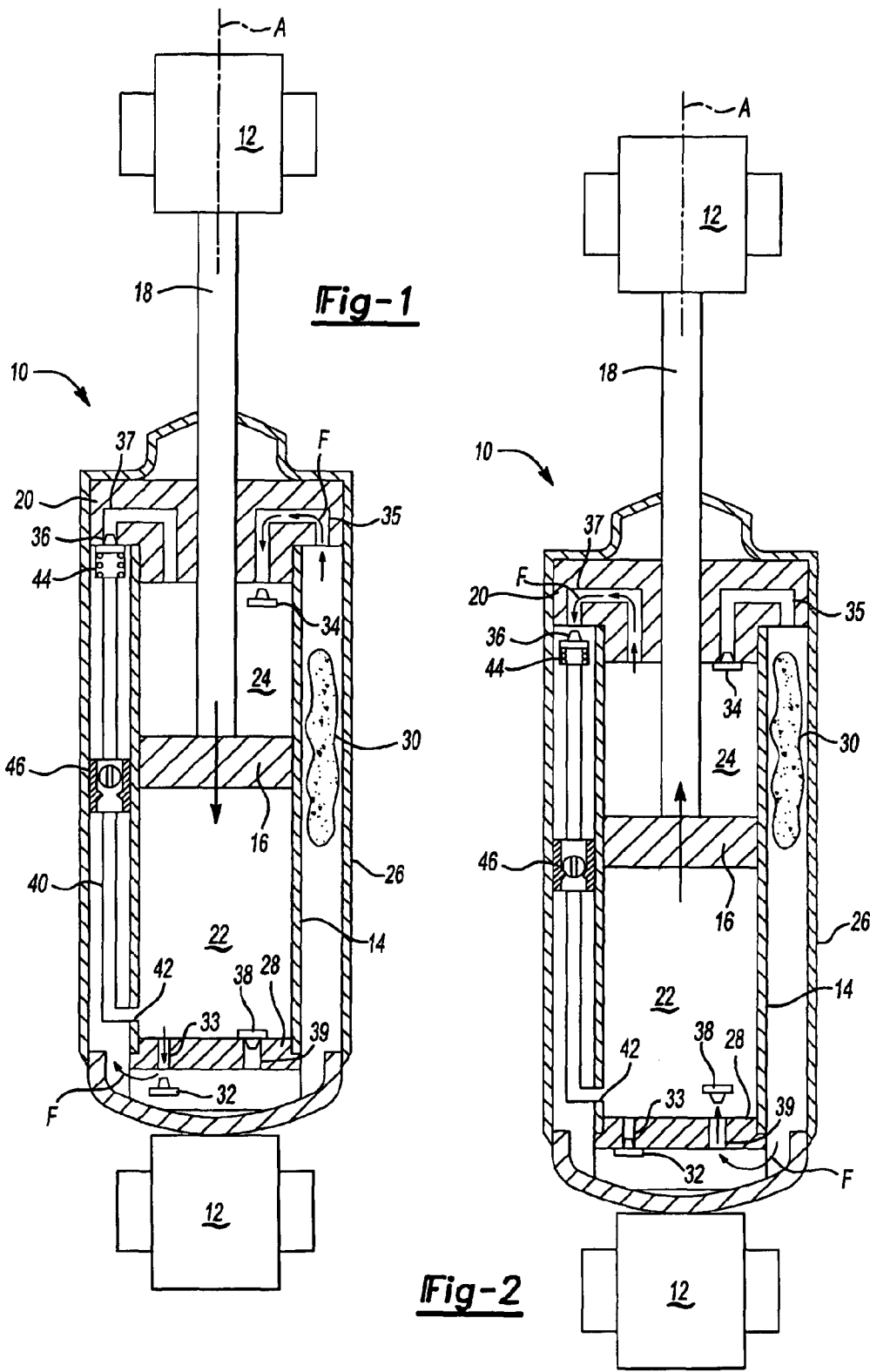

ADAPTIVE SHOCK DAMPING CONTROL

BACKGROUND OF THE INVENTION

This invention relates to shock absorber, and more particularly, the invention relates to a twin tube shock absorber having adaptive damping control.

Shock absorber dampers are used to dampen suspension movement by absorbing the energy of the impacts transmitted from the roadway and dissipating it as heat. Typically, dampers have a fixed set of valves, and the force generated by the damper is simply a function of the speed at which the damper is moving. As a result, each damper is designed with a particular speed in mind.

One type of damper is a twin tube arrangement in which a working cylinder is surrounded by a reservoir. A piston moves through fluid in the working cylinder and forces the fluid through a series of valves or ports, which acts to impede the motion of the piston and dampen the input from the roadway. The fluid passes through valves in a cylinder head and compression head into the reservoir during the compression stroke to accommodate the volume of a piston rod, which compresses a gas cell located in the reservoir. During the recoil stroke, the fluid exits the reservoir through other valves to the working cylinder through another set of valves. Unfortunately, these valves are only able to provide dampening that is a function of the piston speed.

It is desirable to provide a stiffer damper as the piston speed increases. The prior art has achieved this by incorporating sensors that monitor piston speed and a power supply that actuates valves to regulate the flow of fluid and adjust damping. However, these systems are complex and costly. Therefore, it is desirable to provide adjustable or adaptive dampening without external sensor power.

SUMMARY OF THE INVENTION AND ADVANTAGES

The present invention provides a shock absorber damper assembly including a working cylinder filled with fluid. A piston and rod are disposed in the working cylinder and move along an axis to provide dampening during a compression stroke. For a twin tube arrangement, a reservoir surrounds the working cylinder and may include a gas cell to accommodate the volume of the rod. A recoil valve controls flow of the fluid from the working cylinder to the reservoir during a recoil stroke. The recoil valve has an opening force controlling damping during the recoil stroke. A fluid passageway, which may be located in the reservoir, connects the working cylinder and the recoil valve. A check valve is disposed in the fluid passageway and opens to receive the fluid during the compression stroke. The check valve closes during the recoil stroke to retain the fluid against the recoil valve at a pressure and adjust the opening force of the recoil valve.

Accordingly, the above invention provides adjustable or adaptive dampening without external sensors or power.

BRIEF DESCRIPTION OF THE DRAWINGS

Other advantages of the present invention can be understood by reference to the following detailed description when considered in connection with the accompanying drawings wherein:

FIG. 1 is a cross-sectional view of a shock absorber of the present invention during a compression stroke;

FIG. 2 is a cross-sectional view of the shock absorber shown in FIG. 1 during a recoil stroke;

DETAILED DESCRIPTION OF THE PREFERRED EMBODIMENT

Figure 3:
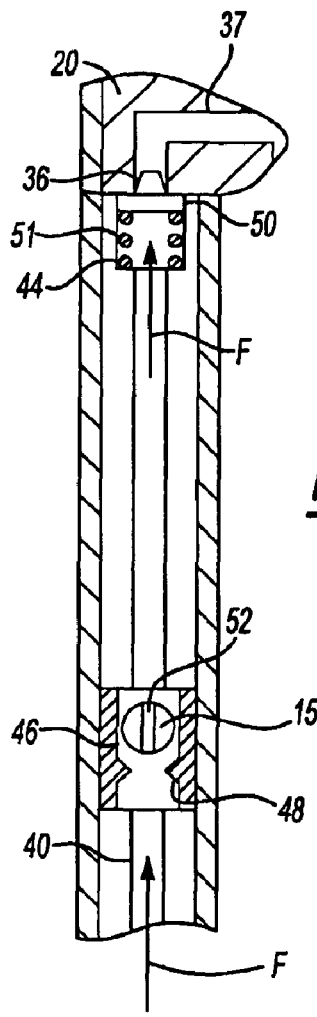
FIG. 3 is an enlarged view of the adaptive check valve and passageway shown in FIG. 1.

A shock absorber damper 10 is shown in FIGS. 1 and 2. FIG. 1 depicts a compression stroke and the associated fluid flow, F, and FIG. 2 depicts a recoil stroke and the associated fluid flow. The damper 10 is connected between a vehicle frame and movable suspension component by opposing ends 12. The damper 10 provides damping for a vehicle by flowing fluid through valves to absorb energy and dissipate the energy from the damper movement as heat.

The damper 10 includes a working cylinder 14 with a piston 16 arranged therein. A rod 18 is connected to the piston 16 and extends to one of the ends 12. The rod 18 is supported by a cylinder head 20. The piston 16 separates the working cylinder 14 into a compression chamber 22 and a recoil or rebound chamber 24. The piston 16 travels along axis A toward the compression chamber 22 during a compression stroke (shown in FIG. 1), and conversely, the piston 16 travels toward the recoil chamber 24 during a recoil stroke (shown in FIG. 2).

A fluid reservoir 26 is arranged about the working cylinder 14 for the twin tube embodiment shown. It is to be understood that a remote reservoir may also be used. A compression head 28 is arranged between the working cylinder 14 and the reservoir 26 adjacent to the compression chamber 22. A gas cell 30 or pocket of gas may be located in the reservoir 26 to accommodate the volume of the rod 18 as it moves through the working cylinder, as is known in the art.

Referring to FIG. 1, the compression head 28 includes a compression valve 32 and passage 33 that fluid connects the compression chamber 22 and reservoir 26 during the compression stroke. The compression valve 32 primarily defines damping during the compression stroke. During the compression stroke, a check valve 34 opens in a passage 35 within the cylinder head 20 to permit fluid to flow from the reservoir 26 to the recoil chamber 24 to fill the increasing volume of the recoil chamber 24 with fluid. Referring to FIG. 2, the cylinder head 20 has a recoil valve 36 that opens during the recoil stroke to permit fluid flow from the recoil chamber 24 through a passage 37 to the reservoir 26. The recoil valve primarily defines the damping during the recoil stroke that follows the compression stroke. During the recoil stroke, a check valve 38 opens in passage 39 within the compression head 28 to permit fluid to flow from the reservoir 26 to the compression chamber 22 to fill the increasing volume.

The above valve arrangement provides damping that is speed dependent. However, it may be desirable to adapt, for example, the recoil stroke based upon the compression stroke. It may be desirable to stiffen the recoil stroke in response to a rapid compression stroke, and to soften the recoil stroke in response to a slow compression stroke. To this end, the present invention employs a fluid passageway 40 arranged in the reservoir 26. The passageway 40 has an inlet 42 at the compression chamber 22 and an outlet 44 at the recoil valve 36. Fluid flow from the compression chamber 22 during the compression stroke pressurizes the area behind the recoil valve 36 to increase the force necessary to open the recoil valve 36 during the recoil stroke. Conversely, the pressure in the area behind the recoil valve 36 is less for a slow compression stroke.

Figure 4:
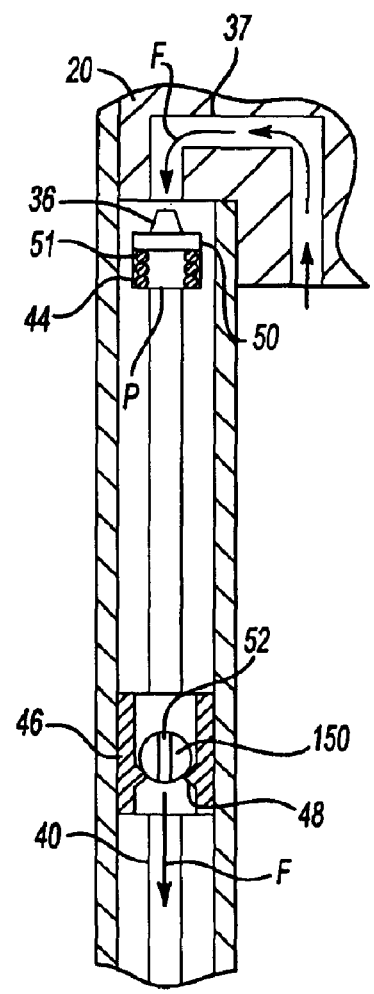
FIG. 4 is an enlarged view of the adaptive check valve and passageway shown in FIG. 2.

Referring to FIG. 3, a check valve 46 is arranged in the passageway 40. A ball 150 or some other member is unseated from a valve seat 48 during a compression stroke to permit fluid to flow in the area behind the recoil valve 36. The recoil valve 36 may include a member 50 biased by a spring 51 to block the passage 37. The area behind the recoil valve 36 pressurizes in relation to the speed of the compression stroke; the higher the speed, the higher the pressure. As shown in FIG. 4, the ball 150 seats against the valve seat 48 during the recoil stroke and sets the pressure behind the recoil valve 36 corresponding to the force needed to open the recoil valve 36. The check valve 46 may include a hole 52 that allows the pressure to escape after a short time returning the opening force of the recoil valve 36 to its original state. Of course, hole 52 would meter the escaping flow at a more restricted rate than the flow rate through the oven check valve 46 during the compression stroke as shown in FIG. 3. In this manner, when a large input is hit by the vehicle, the recoil valve is stiffened to dissipate the additional energy from the larger suspension motion.

The invention has been described in an illustrative manner, and it is to be understood that the terminology that has been used is intended to be in the nature of words of description rather than of limitation. Obviously, many modifications and variations of the present invention are possible in light of the above teachings. For example, a reverse control may be provided so that the pressure generated on the recoil stroke would act to stiffen the compression valving on the compression stroke that follows. It is, therefore, to be understood that within the scope of the appended claims the invention may be practiced otherwise than as specifically described.

What is claimed is:

1. A damper assembly comprising:
   a working cylinder filled with fluid, and a piston disposed in said working cylinder moving along an axis to provide dampening during a compression stroke;
   a reservoir fluidly communicating with said working cylinder;
   a recoil valve controlling flow of the fluid from said working cylinder to said reservoir during a recoil stroke, said recoil valve having an opening force controlling damping during said recoil stroke;
   a fluid passageway fluidly connecting said working cylinder and said recoil valve;
   an adaptive check valve disposed in said fluid passageway and opening to receive the fluid during said compression stroke and closing to retain the fluid against said recoil valve at a pressure during said recoil stroke for adjusting said opening force; and
   a portion of said fluid passageway intermediate said adaptive check valve and said recoil valve being fluidly isolated from said reservoir.

2. The assembly according to claim 1, wherein said recoil valve is supported by a cylinder head supporting a rod connected to said piston.

3. The assembly according to claim 2, wherein a recoil check valve is supported in a compression head opposite said cylinder head and opening to permit fluid flow from said reservoir to said working cylinder during said recoil stroke.

4. The assembly according to claim 1, wherein said fluid passageway is arranged parallel to said axis and within said reservoir.

5. The assembly according to claim 1, wherein said fluid passageway includes an inlet fluidly connected to said working cylinder and an outlet fluidly connected to said recoil valve with said adaptive check valve arranged between said inlet and said outlet, and such that said fluid passageway is completely fluidly isolated from said reservoir.

6. The assembly according to claim 1, wherein said adaptive check valve includes a bleed path permitting the fluid to bleed past said adaptive check valve at a predetermined rate during said recoil stroke.

7. The assembly according to claim 6, wherein said bleed path provides more resistance to flow of the fluid past said adaptive check valve during said recoil stroke than a flow of fluid through said adaptive check valve as said adaptive check valve opens dining said compression stroke.

8. The assembly according to claim 1, wherein a compression head includes a compression valve controlling flow of the fluid from said working cylinder to said reservoir during said compression stroke.

9. The assembly according to claim 8, wherein a cylinder head opposite said compression head supports a rod connected to said piston, said cylinder head having a compression check valve opening to permit fluid flow from said reservoir to said working cylinder during said compression stroke.

10. The assembly according to claim 9, wherein said working cylinder includes a compression chamber adjacent to said compression head and a recoil chamber adjacent to said cylinder head with said piston separating said compression and said recoil chambers.

11. The assembly according to claim 10, wherein said piston blocks flow of the fluid between said compression and said recoil chambers.

12. The assembly according to claim 1, wherein said reservoir surrounds said working cylinder.

* * * * *